(12) United States Patent
Ito et al.

(10) Patent No.: US 10,678,167 B2
(45) Date of Patent: Jun. 9, 2020

(54) ENDLESS BELT

(71) Applicant: Sumitomo Riko Company Limited, Aichi (JP)

(72) Inventors: Daiki Ito, Aichi (JP); Teruyoshi Kimpara, Aichi (JP); Tsukasa Fujita, Aichi (JP); Satoshi Endo, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/509,480

(22) Filed: Jul. 11, 2019

(65) Prior Publication Data

US 2019/0339636 A1 Nov. 7, 2019

Related U.S. Application Data

(63) Continuation of application No. PCT/JP2017/035105, filed on Sep. 28, 2017.

(30) Foreign Application Priority Data

Jan. 30, 2017 (JP) .................... 2017-014320

(51) Int. Cl.
*G03G 15/16* (2006.01)
*G03G 15/20* (2006.01)
*G03G 15/00* (2006.01)

(52) U.S. Cl.
CPC ..... *G03G 15/1605* (2013.01); *G03G 15/2053* (2013.01); *G03G 15/6529* (2013.01)

(58) Field of Classification Search
CPC .............. G03G 15/162; G03G 15/2053; G03G 2215/1623; G03G 2215/2009; G03G 2215/2016
See application file for complete search history.

(56) References Cited

U.S. PATENT DOCUMENTS 7,953,356 B2 * 5/2011 Ito .................... G03G 15/1685
399/165
9,471,011 B2 * 10/2016 Kikuchi ............. G03G 15/1605
(Continued)

FOREIGN PATENT DOCUMENTS

JP       H1063013     3/1998
JP       2005017664     1/2005
(Continued)

OTHER PUBLICATIONS

"International Preliminary Report on Patentability (Form PCT/IPEA/409) of PCT/JP2017/035105," completed on Dec. 18, 2018, with English translation thereof, pp. 1-9.

(Continued)

*Primary Examiner* — Erika J Villaluna
(74) *Attorney, Agent, or Firm* — JCIPRNET

(57) ABSTRACT

Provided is an endless belt which can improve rotational durability when compared to a conventional endless belt. This endless belt is formed in a tubular shape and is used for electronic photographing apparatuses. The endless belt has an edge part which is formed on at least one belt edge in the belt width direction and which has an end that is tapered toward the outside of the belt width direction. The edge part can be configured by a first edge part formed by intersecting an outer inclined surface with a belt inner circumferential surface, a second edge part configured by intersecting an inner inclined surface with a belt outer circumferential surface, or a third edge part configured by intersecting the outer inclined surface with the inner inclined surface.

3 Claims, 7 Drawing Sheets

(56) References Cited

U.S. PATENT DOCUMENTS 9,507,297 B2    11/2016    Matsushima et al.
2009/0136278 A1    5/2009    Derimiggio et al.

FOREIGN PATENT DOCUMENTS

| JP | 2009156981 | 7/2009 |
| JP | 2016133534 | 7/2016 |

OTHER PUBLICATIONS

"International Search Report (Form PCT/ISA/210) of PCT/JP2017/035105," dated Nov. 7, 2017, with English translation thereof, pp. 1-5.

* cited by examiner

ENDLESS BELT

CROSS-REFERENCE TO RELATED APPLICATION

The present application is a continuation of PCT/JP2017/035105, filed on Sep. 28, 2017, and is related to and claims priority from Japanese patent application no. 2017-014320, filed on Jan. 30, 2017. The entire contents of the aforementioned application are hereby incorporated by reference herein.

TECHNICAL FIELD

The disclosure relates to an endless belt.

RELATED ART

In the related art, electronic photographing apparatuses such as electrophotographic type copying machines, printers, and printing machines are known. In such an electronic photographing apparatus, for example, an endless belt such as an intermediate transfer belt, a fixing belt, or a conveyor belt is incorporated.

Regarding this type of endless belt, for example, an endless belt in which belt edges on both sides in a tubular belt body are cut in a belt thickness direction by a cutting tool to have a product size is known. In addition, in Patent Literature 1 (Japanese Laid-open No. 2016-133534), an endless belt having a shape in which belt edges on both sides bulge in the entire belt circumferential direction is disclosed. It is described in Patent Literature 1 that the belt edges are thermally melted to form the above bulging shape.

However, endless belts known in the related art have the following issues. Specifically, endless belts are generally likely to meander in the belt width direction during rotational travel. In order to prevent such meandering of endless belts, generally, a flange member for restricting meandering of an endless belt is provided at both ends of a roller that stretches the endless belt. In an endless belt having belt edges cut in the belt thickness direction by a cutting tool, when the belt edges are continuously in contact with the flange member due to meandering, an excessive load is applied to the belt edge, cracks may occur, and the endless belt may break.

On the other hand, an endless belt having belt edges formed in a round bulging shape comes in contact with a roller in a state that the belt edges are raised above the main plane of the belt due to its shape. In this state, when the endless belt continues rotational travel, an excessive load is also applied to the belt edge, cracks may occur, and the endless belt may break.

The disclosure provides an endless belt having more improved rotational durability than those of the related art.

SUMMARY

According to an aspect of the disclosure, there is provided an endless belt having a tubular shape used for an electronic photographing apparatus, including an edge part that is forming in a tapered shape facing outward in a belt width direction in at least one belt edge in the belt width direction.

According to another aspect of the disclosure, there is provided a method for manufacturing a tubular endless belt used for an electronic photographing apparatus, including cutting at least one belt edge in a belt width direction in a belt body having a tubular shape from at least one side of a belt outer circumferential surface side and a belt inner circumferential surface side by a carbon dioxide gas laser to form an endless belt.

BRIEF DESCRIPTION OF DRAWINGS

FIG. 3(a) is an explanatory diagram showing both enlarged belt edges corresponding to FIG. 2, and FIG. 3(b) is an explanatory diagram of one belt edge (a part) when viewed from a belt outer circumferential surface side.

DESCRIPTION OF EMBODIMENTS

Figure 1:
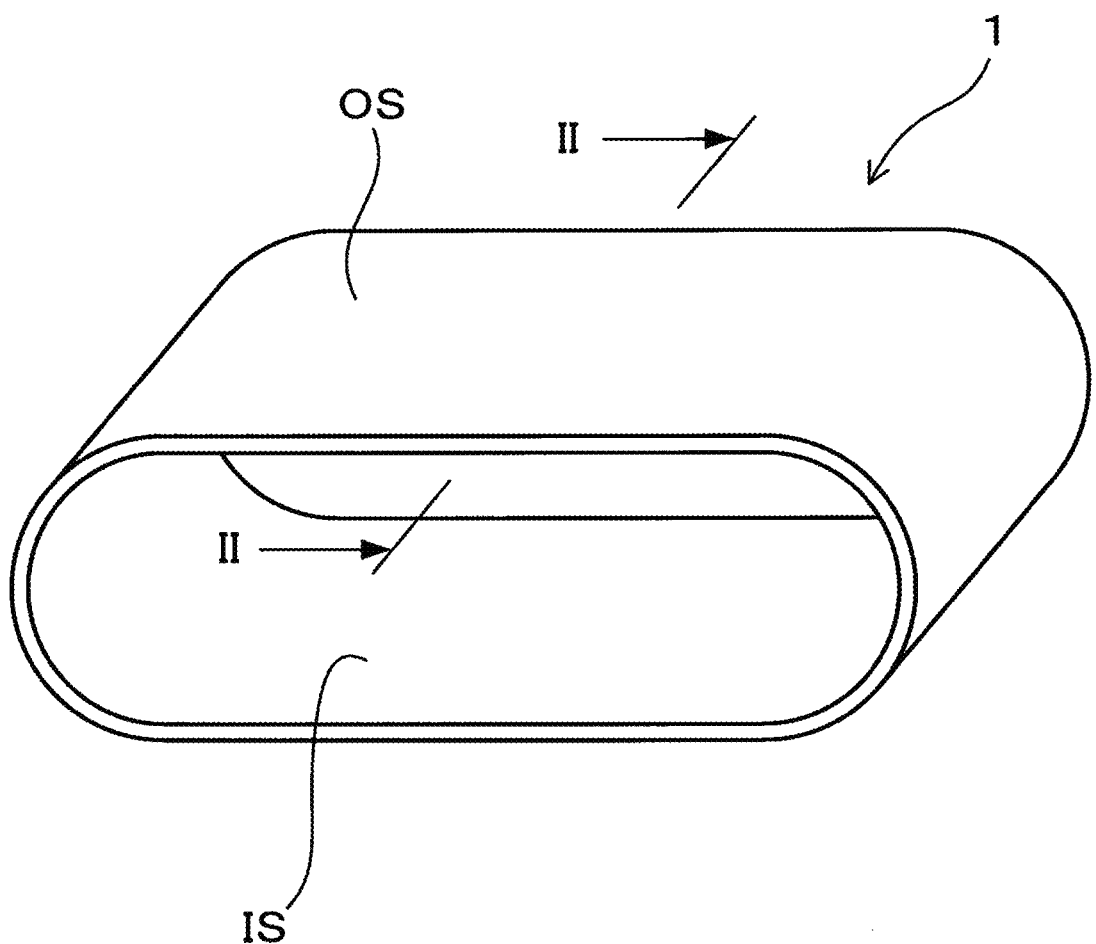
FIG. 1 is an explanatory diagram schematically showing an endless belt of Example 1.

The endless belt will be described.

The endless belt (seamless belt) is used for an electronic photographing apparatus. Examples of the electronic photographing apparatus include image forming devices such as copying machines, printer, facsimiles, multi-functional machines, and on-demand printing machines, which use an electrophotographic method using a charged image.

Specifically, the endless belt can be used as, for example, an intermediate transfer belt, a fixing belt, a conveyor belt, and the like. In addition, the intermediate transfer belt is an endless belt incorporated into an image forming device in order that a toner image supported on a latent image carrier is primarily transferred to a surface of the belt and then the toner image is secondarily transferred to a print medium such as paper from the belt surface. The fixing belt is an endless belt used for melting and fixing the toner transferred to a transfer material (paper) by heating to form an image. The conveyor belt is an endless belt used for directly placing and conveying the transfer material (paper) on the belt, and directly transferring the toner to the transfer material from the latent image carriers of each color. According to the above configuration, the intermediate transfer belt, the fixing belt, and the conveyor belt having improved rotational durability are obtained.

Specifically, the endless belt can have a configuration (1) including a single tubular base layer, a configuration (2) including a tubular base layer and an elastic layer formed along an outer circumferential surface of the base layer, a configuration (3) including a tubular base layer and a surface layer formed along an outer circumferential surface of the base layer, a configuration (4) including a tubular base layer, an elastic layer formed along an outer circumferential surface of the base layer, and a surface layer formed along an outer circumferential surface of the elastic layer, a configuration (5) including a tubular base layer, a conductive layer formed along an outer circumferential surface of the base layer, an elastic layer formed along an outer circumferential surface of the conductive layer, and a surface layer formed along an outer circumferential surface of the elastic layer, a configuration (6) including a tubular base layer, an underlayer formed along an outer circumferential surface of the base layer, a conductive layer formed along an outer circumferential surface of the underlayer, an elastic layer formed along an outer circumferential surface of the conductive layer, and a surface layer formed along an outer circumferential surface of the elastic layer, or the like. Here, the configurations (1) to (4) are suitable form for an intermediate transfer belt, a conveyor belt, and the like. In addition, the configurations (5) and (6) are suitable form for a fixing belt and the like.

The endless belt may have an edge part formed in a tapered shape facing outward in the belt width direction on both belt edges in the belt width direction or any one belt edge in the belt width direction. The endless belt may have an edge part formed in a tapered shape facing outward in the belt width direction on both belt edges in the belt width direction. According to such a configuration, even if the endless belt meanders to either the left or right side during rotational travel, the above effects can be provided. Here, the edge part can be provided over the entire belt circumferential direction.

In the endless belt, the edge part can be configured by a first edge part in which an outer inclined surface inclined from a belt outer circumferential surface toward a belt inner circumferential surface intersects with the belt inner circumferential surface, and an angle $\theta_1$ formed by the outer inclined surface and the belt inner circumferential surface is an acute angle. In addition, the edge part can be configured by a second edge part in which an inner inclined surface inclined from a belt inner circumferential surface toward the belt outer circumferential surface intersects with the belt outer circumferential surface, and an angle $\theta_2$ formed by the inner inclined surface and the belt outer circumferential surface is an acute angle. In addition, the edge part can be configured by a third edge part in which the outer inclined surface intersects with the inner inclined surface, and $\theta_3/2$ obtained by halving an angle $\theta_3$ formed by the outer inclined surface and the inner inclined surface is an acute angle. Thus, the endless belt can have the first edge part, the second edge part, or the third edge part on both belt edges respectively. In addition, the endless belt has the first edge part, the second edge part, or the third edge part on one belt edge and a first edge part, a second edge part, or a third edge part having a different configuration from the one belt edge on the other belt edge. According to the above configuration, it is possible to obtain an endless belt of which rotational durability can be improved more reliably. In addition, when the edge parts on both belt edges are of the same type, an endless belt with excellent manufacturability is obtained.

In the endless belt, any one of the above angles $\theta_1$, $\theta_2$, and $\theta_3/2$ can all be 50° or more and 85° or less. In such a configuration, the first edge part, the second edge part, and the third edge part are easily brought into linear contact with a flange member, and buckling of the first edge part, the second edge part, and the third edge part due to long-term contact with the flange part is hardly to occur. Therefore, according to the above configuration, it is possible to obtain an endless belt of which rotational durability can be improved more reliably.

From the points of view of improvement in buckling resistance of the first edge part, the second edge part, and the third edge part, the above angles $\theta_1$, $\theta_2$, and $\theta_3/2$ may be 52° or more, 54° or more, 56° or more, 58° or more, or 60° or more. In addition, from the points of view of reducing a contact area of the first edge part, the second edge part, and the third edge part with the flange member, and easily maintaining linear contact with a flange part for a long time, the above angles $\theta_1$, $\theta_2$, and $\theta_3/2$ may be 83° or less, 80° or less, 78° or less, or 75° or less.

Here, the above angles $\theta_1$, $\theta_2$, and $\theta_3$ are measured as follows. A cross section when the endless belt is cut in the belt width direction is observed under a laser microscope and an observation image is acquired. Then, the angle $\theta_1$ is measured as follows. In the observation image, lines are drawn along an outer oblique side corresponding to an outer inclined surface and an inner side corresponding to a belt inner circumferential surface, and an angle formed by the outer oblique side and the inner side is measured. Similarly, the angle $\theta_2$ is measured as follows. In an observation image, lines are drawn along an inner oblique side corresponding to an inner inclined surface and an outer side corresponding to a belt outer circumferential surface, and an angle formed by the inner oblique side and the outer side is measured. The angle $\theta_3$ is measured as follows. In an observation image, lines are drawn along an outer oblique side corresponding to an outer inclined surface and an inner oblique side corresponding to an inner inclined surface, and an angle formed by the outer oblique side and the inner oblique side is measured.

When the edge part is configured by a first edge part, the endless belt can be a configuration to comprise a heat affected part provided in a part of the belt outer circumferential surface near the outer inclined surface. In addition, when the edge part is configured by a second edge part, the endless belt can have a configuration to comprise a heat affected part provided in a part of the belt inner circumferential surface near the inner inclined surface. In addition, when the edge part is configured by a third edge part, the endless belt can have a configuration to comprise a heat affected part provided in at least one of a part of the belt outer circumferential surface near the outer inclined surface and a part of the belt inner circumferential surface near the inner inclined surface. The heat affected part is a part in which characteristics of a belt material are changed due to heat. In any of the above cases, the width of the heat affected part can be 100 μm or less.

According to the above configuration, it is possible to obtain an endless belt that can easily prevent deterioration of rotational durability caused by changes in characteristics due to the heat affected part in the belt edge. Examples of the heat affected part include a carbonized part generated by heat during cutting according to carbon dioxide gas laser processing. Here, the heat affected part may be present in surface parts of the outer inclined surface and the inner inclined surface.

From the points of view of securing the above actions and effects, the width of the heat affected part may be 95 m or less, 90 μm or less, 85 μm or less, or 80 μm or less.

The width of the heat affected part which is a part of the belt outer circumferential surface near the outer inclined surface is an average value (n=10) of values of the measurement widths in the belt width direction measured in the heat affected part on the belt outer circumferential surface using an observation image obtained from the belt outer circumferential surface side under a laser microscope. Similarly, the width of the heat affected part which is a part of the belt inner circumferential surface near the inner inclined surface is an average value (n=10) of values of the measurement widths in the belt width direction, which is measured for the heat affected part on the belt inner circumferential surface, by using an observation image observed from the belt inner circumferential surface side under a laser microscope.

In addition, the endless belt may not have a heat affected part. A configuration without a heat affected part on the belt edge, for example, can be formed by polishing the belt edge to form a predetermined inclined surface after the belt edge of the tubular belt body is cut along the belt thickness direction by a cutting tool, or the like.

Next, a method for manufacturing the endless belt will be described.

In the method for manufacturing the endless belt, the belt body is formed to have a larger size in the belt width direction than the endless belt. That is, the belt body is cut into an endless belt having a predetermined product size.

In the method for manufacturing the endless belt, a belt material is discharged from a nozzle of a dispenser and a belt body can be molded on an outer circumference of a mold by being subjected to a process of applying the belt material in a spiral shape to the outer circumferential surface of the mold. According to this configuration, after the belt body is molded on the mold, the belt edge of the belt body on the mold is directly burned out with a carbon dioxide gas laser, and thereby an endless belt having the above first edge part can be manufactured relatively easily. In addition, when the belt body has a laminated structure, belt materials chosen according to formation of layers can be sequentially applied and overlapped in a spiral shape. More specifically, for example, when the endless belt is configured by a single base layer, a material for forming the base layer is applied in a spiral shape to the outer circumferential surface of the mold, the entire coating film (first layer) formed of a spiral coating film continuum is formed, and a heat treatment may then be performed thereon as necessary. In addition, for example, when the endless belt is configured by a base layer and an elastic layer, a material for forming the elastic layer is applied in a spiral shape to the entire coating film (first layer) after the heat treatment described above, the entire coating film (second layer) formed of a spiral coating film continuum is formed, and a heat treatment may then be performed thereon as necessary. In addition, for example, when the endless belt is formed of a base layer, an elastic layer, and a surface layer, a material for forming the surface layer is applied in a spiral shape to the entire coating film (second layer) after the heat treatment described above, the entire coating film (third layer) formed of a spiral coating film continuum is formed, and a heat treatment may then be performed thereon as necessary.

Here, the above configurations can be combined arbitrarily as necessary in order to obtain the above actions and effects.

EXAMPLES

Endless belts of examples and a method for manufacturing the same will be described below with reference to the drawings.

Example 1

Figure 2:
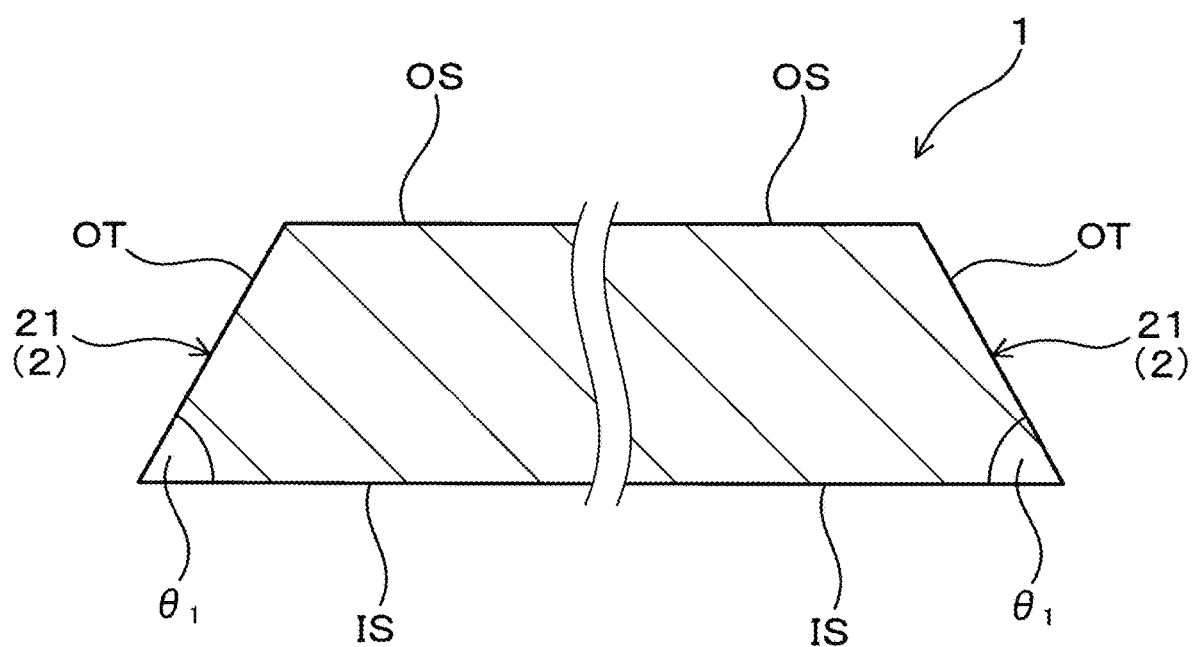
FIG. 2 is an explanatory diagram schematically showing both enlarged belt edges in a cross section taken along the line 11-II in FIG. 1.

An endless belt of Example 1 will be described with reference to FIG. 1 and FIG. 2. As shown in FIG. 1 and FIG. 2, an endless belt 1 of this example is formed in a tubular shape and is used for an electronic photographing apparatus. In this example, the endless belt 1 has a tubular base layer, and is incorporated into an electrophotographic type image forming device and used as an intermediate transfer belt. In addition, the endless belt 1 has conductivity.

The endless belt 1 has an edge part 2 formed in a tapered shape facing outward in the belt width direction on at least one belt edge in the belt width direction. FIG. 2 shows an example in which the edge part 2 is provided in both of one belt edge and the other belt edge in the belt width direction.

In this example, specifically, the edge part 2 is configured by a first edge part 21 in which an outer inclined surface OT inclined from an end at an outer side in the belt width direction on a belt outer circumferential surface OS toward a belt inner circumferential surface IS intersects with the belt inner circumferential surface IS, and an angle $\theta_1$ formed by the outer inclined surface OT and the belt inner circumferential surface IS is an acute angle. The angle $\theta_1$ is in a range of 50° or more and 85° or less. In addition, the thickness of the belt can be, for example, in a range of 30 μm or more and 300 μm or less.

The endless belt 1 of this example can be manufactured, for example, as follows. First, a belt material (in this example, a material for forming the base layer) is discharged from a nozzle of a dispenser (a liquid quantification and discharge device) and a belt body (not shown) is molded on the outer circumference of the mold (not shown) by being subjected to a process of applying the belt material in a spiral shape to an outer circumferential surface of a mold. Next, both belt edges of the belt body on the mold are cut by a cutting tool in the belt thickness direction. Next, the cut belt body is removed from the mold, and the cut part is polished so that the outer inclined surface OT is formed. Thereby, the endless belt 1 of this example can be manufactured.

Example 2

Figure 3A:
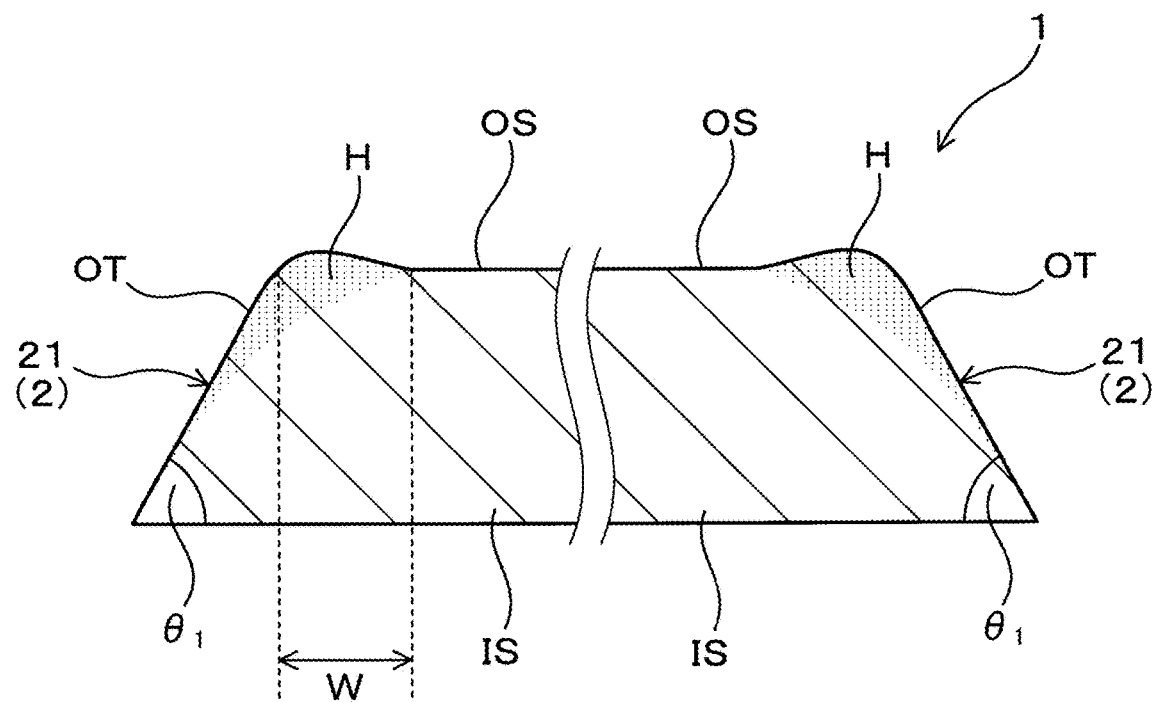
FIGS. 3(a) and 3(b) show explanatory diagram schematically showing an endless belt of Example 2.
Figure 3B:
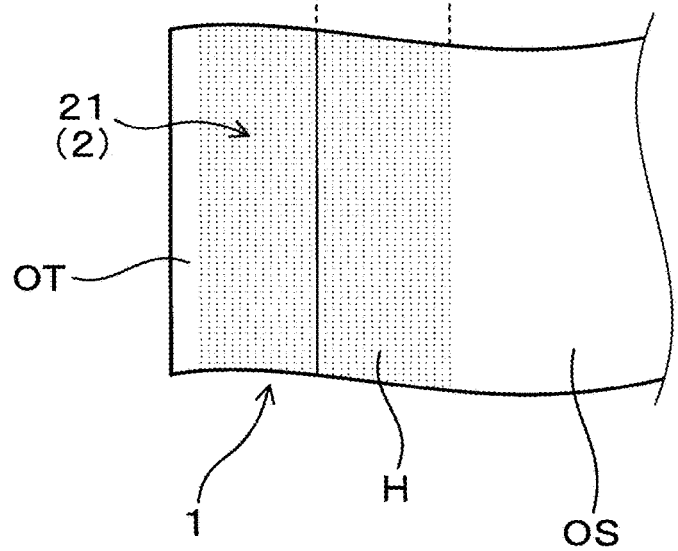

An endless belt of Example 2 will be described with reference to FIGS. 3(a) and 3(b). As shown in FIGS. 3(a) and 3(b), the endless belt 1 of this example has the edge part 2 on both of one belt edge and the other belt edge in the belt width direction in the same manner as in the endless belt of Example 1. The edge part 2 is configured by the first edge part 21.

In this example, in a part of the belt outer circumferential surface OS near the outer inclined surface OT, a heat affected part H in which characteristics of the belt material are changed due to heat is provided. A width W of the heat affected part H is 100 μm or less. Here, in this example, the heat affected part H is continuously present from a part of the belt outer circumferential surface OS near the outer inclined surface OT to a surface part of the outer inclined surface OT. The endless belt 1 of this example has the heat affected part H on both belt edges. Other configurations are the same as in Example 1.

A method for manufacturing an endless belt of this example is a method in which at least one belt edge in the belt width direction in a tubular belt body is cut with a carbon dioxide gas laser from at least one side of the belt outer circumferential surface side and the belt inner circumferential surface, and thereby an endless belt is manufactured.

Here, in order to manufacture the endless belt 1 of this example, both belt edges in the belt width direction in the tubular belt body are cut with a carbon dioxide gas laser from the belt outer circumferential surface side.

Specifically, in the method for manufacturing the endless belt of this example, the belt material (in this example, the material for forming the base layer) is discharged from the nozzle of the dispenser (a liquid quantification and discharge device), and a belt body is molded on the outer circumference of the mold by being subjected to a process of applying the belt material in a spiral shape to an outer circumferential surface of a mold. Next, a carbon dioxide gas laser is emitted perpendicular to a mold surface from the belt outer circumferential surface side to the belt edge of the belt body on the mold, and the edge of the belt body is burned out in the belt circumferential direction. In this case, the mold may be rotated about the cylinder axis of the belt body, and a laser irradiated part of the carbon dioxide gas laser may be rotated in the circumferential direction of the belt body. Next, the endless belt 1 formed on the mold is removed from the mold. Thereby, the endless belt 1 can be obtained.

Example 3

Figure 4:
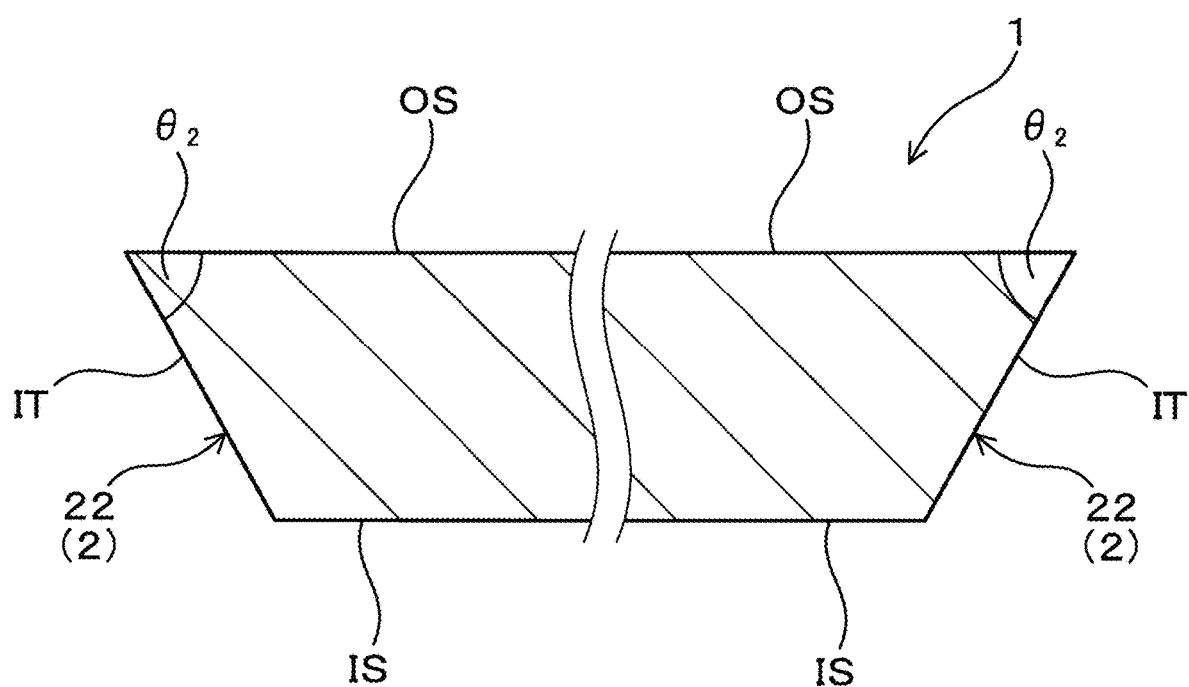
FIG. 4 is an explanatory diagram schematically showing an endless belt of Example 3 corresponding to FIG. 2.

An endless belt of Example 3 will be described with reference to FIG. 4. As shown in FIG. 4, the endless belt 1 of this example has the edge part 2 on both of one belt edge and the other belt edge in the belt width direction in the same manner as in the endless belt of Example 1.

In this example, specifically, the edge part 2 is configured by a second edge part 22 in which an inner inclined surface IT inclined from an end at an outer side in the belt width direction on a belt inner circumferential surface IS toward a belt outer circumferential surface OS intersects with the belt outer circumferential surface OS, and the angle $\theta_2$ formed by the inner inclined surface IT and the belt outer circumferential surface OS is an acute angle. The angle $\theta_2$ is in a range of 50° or more and 85° or less. In addition, the thickness of the belt can be, for example, in a range of 30 μm or more and 300 μm or less. Other configurations are the same as in Example 1.

The endless belt 1 of this example can be manufactured, for example, as follows. First, the belt material (in this example, a base-layer-forming material) is discharged from the nozzle of the dispenser (a liquid quantification and discharge device) and a belt body (not shown) is molded on the outer circumference of the mold (not shown) by being subjected to a process of applying the belt material in a spiral manner to an outer circumferential surface of a mold. Next, both belt edges of the belt body on the mold are cut by a cutting tool in the belt thickness direction. Next, the cut belt body is removed from the mold, and the cut part is polished so that the inner inclined surface IT is formed. Thereby, the endless belt 1 of this example can be manufactured.

Example 4

Figure 5:
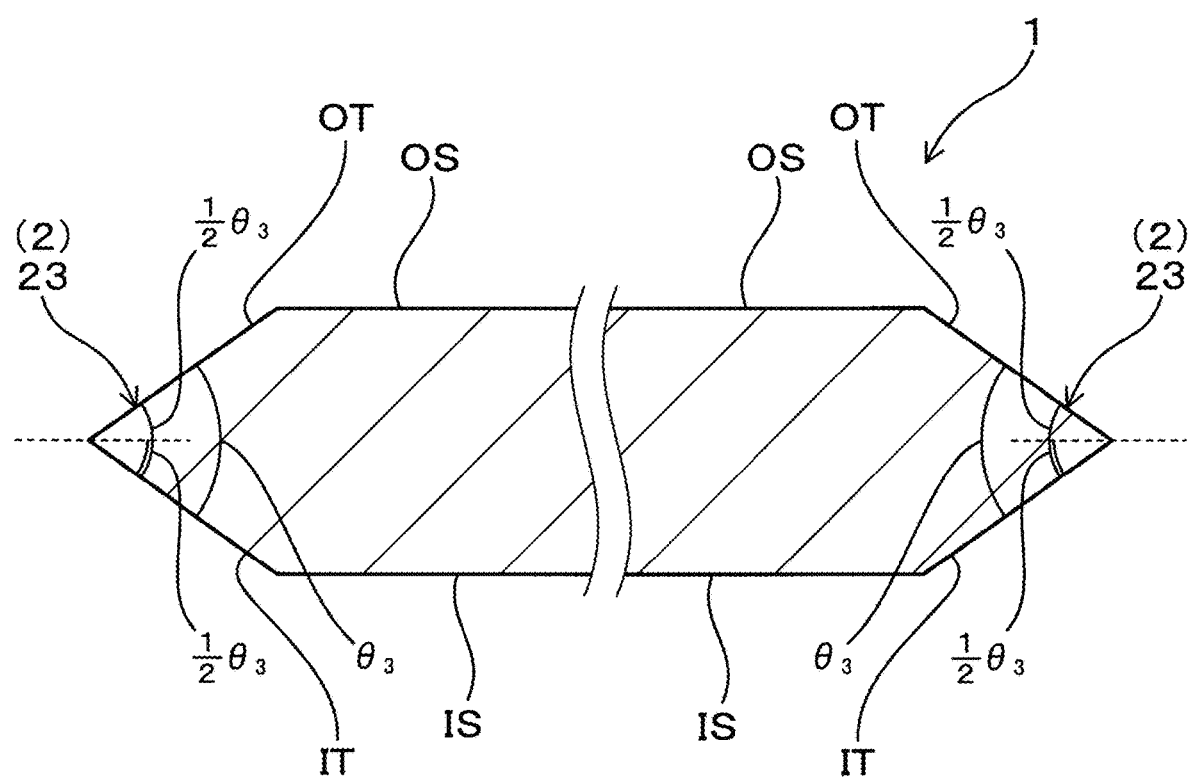
FIG. 5 is an explanatory diagram schematically showing an endless belt of Example 4 corresponding to FIG. 2.

An endless belt of Example 4 will be described with reference to FIG. 5. As shown in FIG. 5, the endless belt 1 of this example has the edge part 2 on both of one belt edge and the other belt edge in the belt width direction in the same manner as in the endless belt of Example 1.

In this example, specifically, the edge part 2 is configured by a third edge part 23 in which an outer inclined surface OT intersects with an inner inclined surface IT, and the angle $\theta_3/2$ obtained by halving an angle $\theta_3$ formed by the outer inclined surface OT and the inner inclined surface IT is an acute angle. The angle $\theta_3/2$ is in a range of 50° or more and 85° or less. In addition, the thickness of the belt can be, for example, in a range of 3 μm or more and 300 μm or less. Other configurations are the same as in Example 1.

The endless belt 1 of this example can be manufactured, for example, as follows. First, the belt material (in this example, a base-layer-forming material) is discharged from the nozzle of the dispenser (a liquid quantification and discharge device) and a belt body (not shown) is molded on the outer circumference of the mold (not shown) by being subjected to a process of applying the belt material it in a spiral shape to an outer circumferential surface of a mold. Next, both belt edges of the belt body on the mold are cut by a cutting tool in the belt thickness direction. Next, the cut belt body is removed from the mold, and the cut part is polished so that the outer inclined surface OT and the inner inclined surface IT are formed. Thereby, the endless belt 1 of this example can be manufactured.

Experimental Examples

The endless belts will be described below in further detail with reference to experimental examples.

<Preparation of a Material for Forming the Base Layer>
100 parts by mass of a polyamide imide (PAI) (Vylomax HR-16NN" commercially available from Toyobo Co., Ltd.), 10 parts by mass of carbon black ("Denka Black" commercially available from Denka Co., Ltd.), and 800 parts by mass of N-methyl-2-pyrrolidone (NMP) were mixed together to prepare a material for forming the base layer.

<Production of Endless Belt Samples>
—Endless Belts of Sample 1 to Sample 5—
An aluminum cylindrical mold was prepared as a substrate. In addition, a dispenser (a liquid quantification and discharge device) having a nozzle was prepared. The nozzle of the dispenser was a needle nozzle with an inner diameter of φ=1 mm. Next, the prepared material for forming the base layer was stored in an air pressure tank, a clearance between the outer circumferential surface of the mold and the nozzle was set to 1 mm, and the mold and the nozzle were set. Next, when the mold was in a vertical state, while rotating around the axis at a rotational speed of 200 rpm, the nozzle from which the material for forming the base layer was discharged was moved downward in the axial direction at a moving speed of 1 mm/sec, a pressure of 0.4 MPa was applied to the air pressure tank, the material for forming the base layer was forcibly sent to the nozzle, and the material for forming the base layer was discharged from the nozzle, and was applied in a spiral shape to the outer circumferential surface of the mold. Thereby, the entire coating film formed of a spiral coating film continuum was formed. Next, the formed entire coating film was subjected to a heat treatment under conditions of heating at room temperature to 250° C. for 2 hours and being left at 250° C. for 1 hour. Thereby, a belt body (with a thickness of 80 μm) formed of the base layer made of a polyamide imide formed in a tubular shape was formed on the outer circumferential surface of the mold.

Next, in Sample 1 to Sample 5, using a carbon dioxide gas laser device ("CO, laser marker LP-4000" commercially available from Panasonic Corporation), a carbon dioxide gas laser was irradiated perpendicular to a mold surface from the belt outer circumferential surface side to the belt edge of the belt body on the mold, and cutting was performed to obtain a belt width with a product size.

In this case, both belt edges of the belt body were sequentially cut with a carbon dioxide gas laser. In addition, when the position of the laser irradiated part of the carbon dioxide gas laser was fixed, and the mold was rotated around the cylinder axis of the belt body, the belt edges of the belt body were cut in the entire belt circumferential direction. In addition, a first edge part having an angle $\theta_1$ shown in Table 1 was formed by changing an irradiation intensity of the carbon dioxide gas laser.

Figure 6:
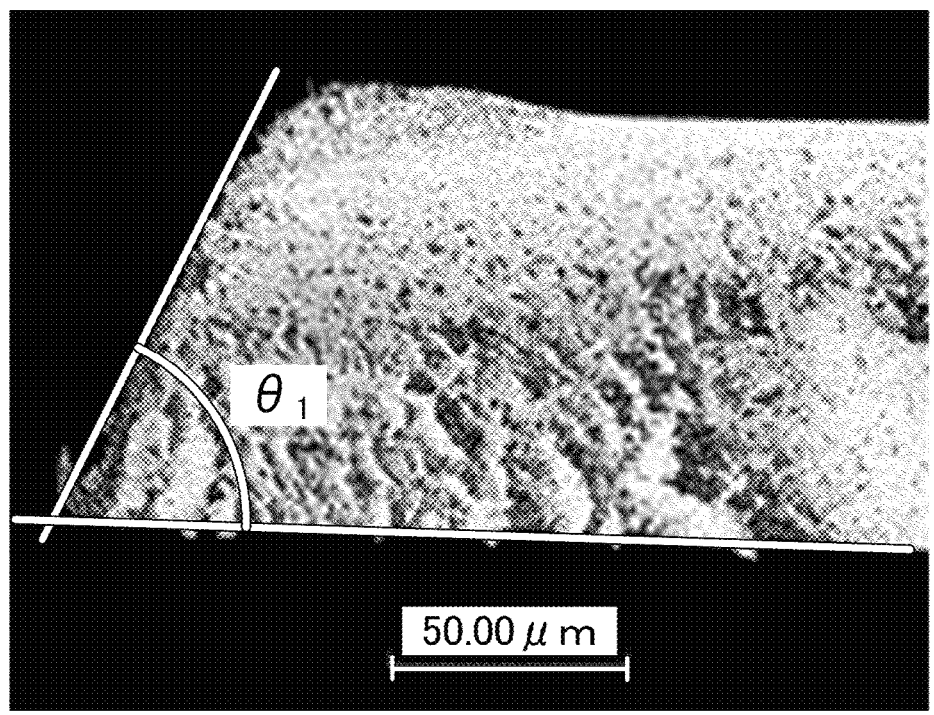
FIG. 6 is a cross-sectional image of one belt edge in an endless belt of Sample 1 observed under a laser microscope.
Figure 7:
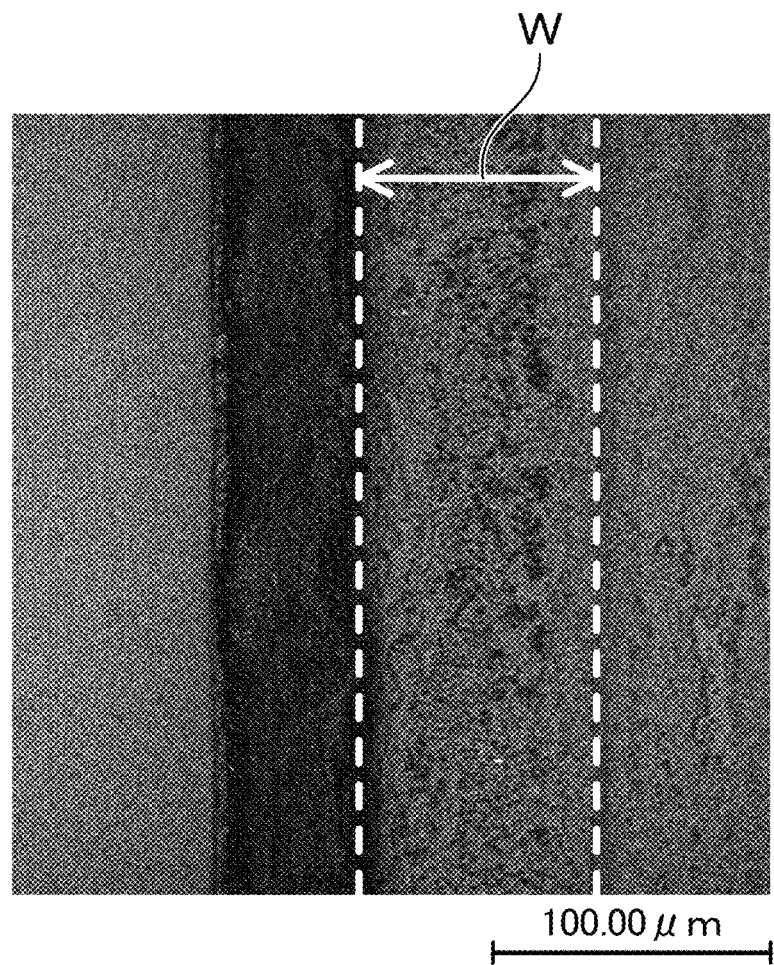
FIG. 7 is a laser microscope image of one belt edge in the endless belt of Sample 1 when viewed from the belt outer circumferential surface side.

Next, a high-pressure air was blown between one edge of the base layer and the outer circumferential surface of the mold, and the mold was removed. Thereby, endless belts of Sample 1 to Sample 5 having a first edge part as an edge part were produced. As a representative example, a cross-sectional image of one belt edge in the endless belt of Sample 1 under a laser microscope is shown in FIG. 6. In addition, a laser microscope image of one belt edge in the endless belt of Sample 1 when viewed from the belt outer circumferential surface side is shown in FIG. 7. As shown in FIG. 6 and FIG. 7, in the endless belts of Sample 1 to Sample 5, a heat affected part formed by carbonization of the belt material due to heat according to carbon dioxide gas laser processing was found in the part of the belt outer circumferential surface near the outer inclined surface and the surface part of the outer inclined surface. In addition, similarly, a heat affected part was found in the endless belts of Sample 7 and Sample 8 to be described below.

—Endless Belt of Sample 6—

In the same manner as in Sample 1, a belt body was molded on a mold. Next, both belt edges of the belt body on the mold was cut in the belt thickness direction by a cutting tool to obtain a belt width with a product size. Next, the cut belt body was removed from the mold, and the cut part was polished in the entire belt circumferential direction using a wrapping film sheet (commercially available from Sumitomo 3M Limited) so that an outer inclined surface having a predetermined inclination was formed. In addition, the wrapping film sheet had an abrasive grain: aluminum oxide (with a particle size of 30 μm), substrate thickness: 3 millimeters. Thereby, an endless belt of Sample 6 having a first edge part as an edge part was produced. Here, the endless belt of Sample 6 had no heat affected part because carbon dioxide gas laser processing was not performed.

—Endless Belt of Sample 7—In the same manner as in Sample 1, a belt body was molded on a mold. Next, the belt body was attached to a jig that can irradiate a carbon dioxide gas laser from the belt back side, and belt edges were cut with a carbon dioxide gas laser to obtain a belt width with a product size. Thereby, an endless belt of Sample 7 having a second edge part as an edge part was obtained.

—Endless Belt of Sample 8—

In the same manner as in Sample 1, a belt body was molded on a mold. Next, in the same manner as in Sample 1, using a carbon dioxide gas laser device, belt edges of the belt body on the mold were cut with a carbon dioxide gas laser. Next, the belt body was attached to a jig that can emit a carbon dioxide gas laser from the belt back side, and belt edges were cut with a carbon dioxide gas laser (a laser was applied to the cut surface from the back side). Thereby, an endless belt of Sample 8 having a third edge part as an edge part was produced.

—Endless Belt of Sample 1C—

An endless belt of Sample 1C was produced in the same manner as in the production of the endless belt of Sample 6 except that no polishing was performed after cutting using a cutting tool.

—Endless Belt of Sample 2C—

Both belt edges in the endless belt of Sample 1C were brought into close to a heat source and thermally melted, and thus the both belt edges were formed in a bulging shape in the entire belt circumferential direction. Thereby, an endless belt of Sample 2C was produced.

<Measurement of Angles $\theta_1$, $\theta_2$, and $\theta_3$>

The angles $\theta_1$, $\theta_2$, and $\theta_3$ in the edge parts were measured according to the above method using a laser microscope ("KEYENCE VK-X100" commercially available from Keyence Corporation). In this case, the measurement magnification was 10,000, and the measurement pitch was 0.10 μm.

<Measurement of Width W of Heat Affected Part>

A width W of the heat affected part was measured according to the above method using a laser microscope ("KEYENCE VK-X100" commercially available from Keyence Corporation). In addition, the width W of the heat affected part was obtained by measuring a distance from a part in which the belt outer circumferential surface intersected with the outer inclined surface in an observation image observed from the belt outer circumferential surface side to a part in which the belt outer circumferential surface was discolored toward the inside in the belt width direction. In this case, the measurement magnification was 10,000, and the measurement pitch was 0.10 μm.

<Rotational Durability Test>

The endless belts of the produced samples were stretched with a tension load of 5 kg on a drive roller and driven roller with a diameter of 10 mm. In this case, the drive roller and the driven roller were set so that, during rotational travel of the endless belt, one belt edge was always inclined and pressed against one side of a flange member made of a polyacetal resin at both ends of the drive roller. In addition, angles of inclination of the drive roller and the driven roller were set so that a pressing load on the flange member of the belt edge was constant at 13 N.

The drive roller was driven to rotate in the above state, and the endless belt was rotated at a rotational speed of 418 mm/sec. When the travel distance of the endless belt was 150 km or more and no cracks occurred in the belt edge, it was evaluated as "A" indicating that it had high rotational durability. In addition, when the travel distance of the endless belt was 100 km or more and less than 150 km, cracks were observed in the belt edge, but breakage was not caused, and there was no problem in practical use, it was evaluated as "B" indicating that improvement in rotational durability was obtained. In addition, when the travel distance of the endless belt was less than 100 km and cracks were observed in the belt edge and the endless belt broken, it was evaluated as "C" indicating that it had no rotational durability.

Detailed configurations and evaluation results of the produced endless belts are summarized in Table 1.

TABLE 1

| | | Sample 1 | Sample 2 | Sample 3 | Sample 4 | Sample 5 | Sample 6 |
|---|---|---|---|---|---|---|---|
| Edge part | Configuration | First edge part | First edge part | First edge part | First edge part | First edge part | First edge part |
| | Molding method | Carbon dioxide gas laser | Carbon dioxide gas laser | Carbon dioxide gas laser | Carbon dioxide gas laser | Carbon dioxide gas laser | Cutting tool + polishing |
| | Formed angle | $\theta_1 = 60°$ | $\theta_1 = 50°$ | $\theta_1 = 85°$ | $\theta_1 = 60°$ | $\theta_1 = 40°$ | $\theta_1 = 60°$ |
| Heat affected | Presence | Yes | Yes | Yes | Yes | Yes | No |
| | Width W | 50 μm | 50 μm | 50 μm | 80 μm | 50 μm | — |

TABLE 1-continued

| part | | | | | | | |
|---|---|---|---|---|---|---|---|
| Rotational durability | | A | A | A | A | B | A |

| | | Sample 7 | Sample 8 | Sample 1C | Sample 2C |
|---|---|---|---|---|---|
| Edge part | Configuration | Second edge part | Third edge part | End surface parallel to belt thickness direction | Bulging shape |
| | Molding method | Carbon dioxide gas laser | Carbon dioxide gas laser | Cutting tool | Cutting tool + thermal melting |
| | Formed angle | $\theta_2 = 60°$ | $\theta_3 = 120°$ $\theta_3/2 = 60°$ | — | — |
| Heat affected part | Presence | Yes | Yes | — | — |
| | Width W | 50 μm | 50 μm | — | — |
| Rotational durability | | A | A | C | C |

According to Table 1, the following can be understood. The endless belt of Sample 1C had a belt edge cut in the belt thickness direction by a cutting tool. Therefore, when the belt edge in contact with the flange member continued to rotate, an excessive load was applied to the belt edge, cracks occurred and the endless belt broken.

The endless belt of Sample 2C had a belt edge formed in a round bulging shape. Therefore, when the belt edge in contact with the flange member continued to rotate, an excessive load was applied to the belt edge, cracks occurred and the endless belt broken.

On the other hand, the endless belts of Samples 1 to 8 had an edge part formed in a tapered shape facing outward in the belt width direction. Specifically, the edge part was configured by the first edge part in the endless belts of Sample 1 to Sample 6, the edge part was configured by the second edge part in the endless belt of Sample 7, and the edge part was configured by the third edge part in the endless belt of Sample 8.

In the endless belts of Samples 1 to 8, it was possible to reduce the occurrence of cracks causing breakage even during long distance rotational travel, and it was possible to improve rotational durability. The reason for this is as follows. Specifically, in the endless belts of Samples 1 to 8, since the tip of the edge part formed in a tapered shape facing outward in the belt width direction was in contact with the flange member, it was possible to reduce a contact area in contact with the flange member. In addition, in the endless belts of Samples 1 to 8, it was possible to prevent the edge part of the belt edge in a lifted state from being in contact with the roller. Therefore, in the endless belts of Samples 1 to 8, it was possible to reduce a load applied to the belt edge, and it was possible to reduce the occurrence of cracks causing breakage.

Next, comparing the endless belts of Sample 1 to Sample 6, it can be understood that, when an angle $\theta_1$ formed by the outer inclined surface and the belt inner circumferential surface in the first edge part was in a range of 50° or more and 85° or less, the buckling resistance of the first edge part was improved, and the rotational durability was easily improved. In addition, based on the results, it can be inferred that, when an angle $\theta_2$ formed by the inner inclined surface and the belt outer circumferential surface in the second edge part and $\theta_3/2$ obtained by halving an angle $\theta_3$ formed by the outer inclined surface and the inner inclined surface in the third edge part were also in a range of 50° or more and 85° or less, the buckling resistance of the second edge part and the third edge part was improved, and the rotational durability was easily improved.

In addition, the endless belts of Sample 1 to Sample 5 had a heat affected part formed by a carbon dioxide gas laser on at least a part of the belt outer circumferential surface near the outer inclined surface. However, even if the endless belts of Sample 1 to Sample 5 had the heat affected part, the width of the heat affected part was limited to 100 μm or less. Therefore, the endless belts of Sample 1 to Sample 5 had improved rotational durability as in the endless belt of Sample 6 having no heat affected part. Here, the rotational durability of the endless belt of Sample 5 was slightly inferior to that of the endless belts of Sample 1 to Sample 4 because $\theta_1$ was below 50°.

In addition, the above endless belts having the first edge part as the edge part were most suitable. This is because, in this case, while the belt body was placed on the mold, when the belt edge was burned out by emitting a carbon dioxide gas laser from the belt outer circumferential surface side of the belt body, it was possible to manufacture an endless belt having the first edge part without polishing or the like, and the number of belt manufacturing processes and simplifying the processes may be reduced.

While examples of the disclosure have been described above in detail, the disclosure is not limited to the examples and experimental examples, and various modifications can be made without departing from the idea and scope of the disclosure.

For example, the heat affected part H may be formed in a part of the belt inner circumferential surface IS near the inner inclined surface IT in the endless belt of Example 3. Such an endless belt was able to be manufactured, for example, after an endless belt was manufactured in the same manner as in Example 1, the belt body was attached to a jig that can irradiated a carbon dioxide gas laser from the belt back side, and belt edges were cut with a carbon dioxide gas laser to obtain a belt width with a product size. In addition, similarly, the heat affected part H may be formed in a part of the belt outer circumferential surface OS near the outer inclined surface OT and a part of the belt inner circumferential surface IS near the inner inclined surface IT in the endless belt of Example 4. Such an endless belt was able to be manufactured, for example, after the endless belt of Example 2 was manufactured, the belt body was attached to a jig that can emit a carbon dioxide gas laser from the belt back side and the belt edges were cut with a carbon dioxide gas laser.

Effect

The endless belt has the above configuration. The endless belt meanders during rotational travel and when a belt edge abuts a flange member, the tip of the edge part formed in a tapered shape facing outward in the belt width direction comes in contact with the flange member. That is, in the endless belt, it is possible to reduce a contact area in contact with the flange member compared to an endless belt having a belt edge cut in the belt thickness direction by a cutting tool. In addition, in the endless belt, it is possible to prevent the edge part of the belt edge in a lifted state from being in contact with the roller. Therefore, in the endless belt, it is possible to reduce a load applied to the belt edge, and it is possible to reduce the occurrence of cracks causing breakage. Therefore, according to the endless belt, it is possible to improve the rotational durability above that in the related art.

According to the method for manufacturing the endless belt, the endless belt can be relatively easily manufactured using a carbon dioxide gas laser. In addition, since a carbon dioxide gas laser is used as the laser, the endless belt can be manufactured at a lower cost compared to when other lasers are used.

What is claimed is:

1. An endless belt having a tubular shape used for an electronic photographing apparatus, comprising:
   an edge part that is formed in a tapered shape facing outward in a belt width direction in at least one belt edge in the belt width direction,
   wherein the edge part is configured by a first edge part in which an outer inclined surface inclined from a belt outer circumferential surface toward a belt inner circumferential surface intersects with the belt inner circumferential surface, and an angle $\theta_1$ formed by the outer inclined surface and the belt inner circumferential surface is an acute angle,
   the angle is 56° or more and 75° or less,
   the edge part is configured by the first edge part, heat affected parts in which characteristics of a belt material are changed due to heat are provided on both ends of the endless belt, is formed by carbonization of a belt material, and each of the heat affected part is provided in a part of the belt outer circumferential surface near the outer inclined surface,
   the heat affected part has a width of 100 μm or less in the belt width direction.

2. An endless belt having a tubular shape used for an electronic photographing apparatus, comprising:
   an edge part that is formed in a tapered shape facing outward in a belt width direction in at least one belt edge in the belt width direction,
   the edge part is configured by a second edge part in which an inner inclined surface inclined from a belt inner circumferential surface toward a belt outer circumferential surface intersects with a belt outer circumferential surface, and an angle $\theta_2$ formed by the inner inclined surface and the belt outer circumferential surface is an acute angle,
   the angle $\theta_2$ is 56° or more and 75° or less,
   the edge part is configured by the second edge part, heat affected parts in which characteristics of a belt material are changed due to heat are provided on both ends of the endless belt, is formed by carbonization of a belt material, and each of the heat affected part is provided in a part of the belt inner circumferential surface near the inner inclined surface,
   the heat affected part has a width of 100 μm or less in the belt width direction.

3. An endless belt having a tubular shape used for an electronic photographing apparatus, comprising:
   an edge part that is formed in a tapered shape facing outward in a belt width direction in at least one belt edge in the belt width direction,
   the edge part is configured by a third edge part in which the outer inclined surface intersects with the inner inclined surface and an angle $\theta_3/2$ obtained by halving an angle $\theta_3$ formed by the outer inclined surface and the inner inclined surface is an acute angle,
   the angle $\theta_3/2$ is 56° or more and 75° or less,
   the edge part is configured by the third edge part, heat affected parts in which characteristics of a belt material are changed due to heat are provided on both ends of the endless belt, is formed by carbonization of a belt material, and each of the heat affected part is provided in at least one of the part of the belt outer circumferential surface near the outer inclined surface and the part of belt inner circumferential surface near the inner inclined surface,
   the heat affected part has a width of 100 μm or less in the belt width direction.

* * * * *